United States Patent Office 3,037,994
Patented June 5, 1962

3,037,994
TRIHALOTETRAHYDROPYRANS
Erich Marcus and John T. Fitzpatrick, Charleston, W. Va., assignors to Union Carbide Corporation, a corporation of New York
No Drawing. Filed Dec. 16, 1959, Ser. No. 859,858
3 Claims. (Cl. 260—345.1)

This invention relates to a class of trihalotetrahydropyrans which are useful as plasticizers for vinyl halide resins. In a particular aspect, this invention relates to a novel method for producing tetrahydropyrans from the reaction of haloaliphatic conjugated dienes with alpha-haloalkyl ethers.

It has been discovered that a valuable class of 4,4-dihalotetrahydropyrans corresponding to the formula

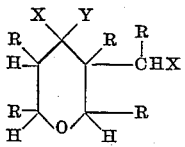

can be produced by a process which comprises reacting together a haloaliphatic conjugated diene corresponding to the formula

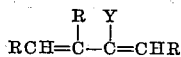

with an aliphatic ether corresponding to the formula

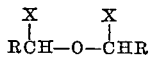

at a temperature between 10° C. and 100° C. in the presence of a Friedel-Crafts catalyst, in a molar ratio of said aliphatic ether to said aliphatic conjugated diene providing a molar excess of said aliphatic ether during the reaction, wherein in the above formulas R is a member selected from the group consisting of hydrogen and alkyl radicals containing between one and eight carbon atoms and X and Y are halogen atoms.

Illustrative of suitable alkyl radicals corresponding to R are methyl, ethyl, propyl, butyl, isobutyl, pentyl, isopentyl, hexyl, isohexyl, heptyl, octyl, isooctyl, and the like. Illustrative of the halogen atoms represented by X are chlorine, bromine and iodine; illustrative of the halogen atoms represented by Y are chlorine, bromine, iodine and fluorine.

Among the aliphatic alpha-haloethers which can be employed in the instant process are bis(chloromethyl) ether; bis(bromomethyl) ether; bis(alpha-chloroethyl) ether; bis - (alpha-bromoethyl) ether; bis(alpha-chlorobutyl) ether; bis(alpha-bromobutyl) ether; chloromethyl alpha-chloroethyl ether; bis(alpha-bromoocty1) ether; bis(iodomethyl) ether; bis(alpha-iodoethyl) ether, and the like.

Among the haloaliphatic conjugated dienes which can be employed in the instant process are chloroprene; bromoprene; fluoroprene; 3-methyl-2-chloro-1,3-butadiene; 3 - ethyl-2-bromo-1,3-butadiene; 3-isopropyl-2-fluoro-1,3-butadiene; 3-heptyl-2-iodo-1,3-butadiene; 3-chloro-2,4-pentadiene; 3-chloro-1,3-pentadiene; 2-methyl-3-bromo-2,4-pentadiene; 2-ethyl-3-chloro-1,3-hexadiene; 3-chloro-2,4-hexadiene; 2-bromo-1,3-heptadiene; 4-chloro-3,5-octadiene; and the like.

Trihalotetrahydropyrans which are particularly amenable for production by the instant invention process are those compounds corresponding to the above general formula in which R is a hydrogen or methyl radical and X and Y are chlorine or bromine atoms. Illustrative of these compounds are 4,4-dichloro-3-(chloromethyl)tetrahydropyran; 4 - bromo-3-(bromomethyl)-4-chlorotetrahydropyran; 4,4-dibromo-3-(bromomethyl)tetrahydropyran; 4,4 - dichloro-3-(chloromethyl)-2,6-dimethyltetrahydropyran; 4,4-dichloro-3-(1-chloroethyl)-tetrahydropyran; 4,4-dibromo-3-(1-bromoethyl)tetrahydropyran; and the like.

The invention process is catalyzed by reagents of the type employed in Friedel-Crafts reactions. Illustrative of the "Friedel-Crafts catalysts" are Lewis acid metal halides such as aluminum chloride, zinc chloride, titanium tetrachloride, stannic chloride, zinc bromide, stannic bromide, and the like, and Lewis acid boron halides such as boron trifluoride. By "Lewis acid" is meant compounds which are electron-acceptors. In certain cases it may be desirable to employ mineral acids such as hydrogen fluoride, sulfuric acid and phosphoric acid to catalyze the reaction.

The catalyst is employed in a quantity sufficient to catalyze the reaction at a practical rate. The quantity of catalyst and the reaction time required for the process can vary depending on the nature of the reactants and the reaction temperature. The quantity of catalyst can vary between about 1 weight percent and 25 weight percent, based on the weight of haloaliphatic conjugated diene employed. Preferably, the catalyst is employed in a quantity between 5 and 10 weight percent, based on the weight of haloaliphatic conjugated diene. The reaction time can vary between about 0.5 hour and 10 hours. In general, a reaction time between four hours and eight hours is sufficient to complete the reaction. In a particularly preferred mode of conducting the invention process, the haloaliphatic conjugated diene is added slowly to the aliphatic alpha-haloether which is contained in the reaction zone under reaction conditions. The rate of addition of the haloaliphatic conjugated diene is a determining factor in the final overall reaction time. The addition period for the haloaliphatic conjugated diene can vary between about 0.5 hour and 10 hours. The faster rates of addition can be employed when a large molar excess of alpha-haloether reactant is being used, i.e., when the total moles of reactants in the process are in a ratio between about 2 moles and about 10 moles of alpha-haloether for each mole of haloaliphatic conjugated diene. The quantity of alpha-haloether employed in excess need only be limited by practical considerations.

The reaction of the haloaliphatic conjugated diene with the alpha-haloether to produce halogenated tetrahydropyrans proceeds on a mole-to-mole basis. Hence, the process can be conducted employing equimolar quantities of reactants. However, it must be emphasized that it is essential that the alpha-haloether be present in a molar excess in the reaction zone during the reaction period. As mentioned previously, this is preferably accomplished by the slow addition of the haloaliphatic conjugated diene to the total quantity of alpha-haloether in the reaction zone. Alternatively, the total moles of reacants can be mixed and reacted directly if a severalfold molar excess of alpha-haloether is employed.

The process can be conducted at a temperature between 10° C. and 100° C. and preferably is conducted at a temperature in the range between 35° C. and 75° C. The pressure of the reaction system can be at atmospheric pressure or at higher pressures. In closed reaction systems such as a bomb, autogenous pressures are convenient and satisfactory. Superatmospheric pressures can be provided by the inclusion of an inert gas (e.g., nitrogen) in the reaction system.

The use of a polymerization inhibitor such as hydroquinone is advantageous and provides higher yields and cleaner products by preventing polymerization of the haloaliphatic conjugated diene component. If desired, inert solvents can be employed as a reaction medium, e.g., acetic acid, tetrahydrofuran, hexan, and the like.

The trihalotetrayhdropyran product can be recovered from the process reaction mixture by fractional distillation.

The following examples will serve to illustrate specific embodiments of this invention.

Example 1

This example illustrates the preparation of 4-bromo-3-(bromomethyl)-4-chlorotetrahydropyran.

A mixture of 408 grams (2 moles) of bis(bromomethyl)-ether, 8 grams of fused and pulverized zinc bromide, and 1 gram of hydroquinone was heated to a temperature of 50° C. To this mixture was added 177 grams (2 moles) of freshly distilled chloroprene with stirring over a period of two hours while maintaining the temperature between 48° C. and 59° C. The reaction product was heated for an additional hour at 55° C. and 60° C. After the addition of 200 milliliters of chloroform, the reaction mixture was washed twice with water, dried over calcium chloride, filtered and distilled to give 408 grams (70 percent yield) of crude product, $n_D^{24}$ 1.5530. The product was redistilled and essentially all of the product distilled at 75° C. to 95° C./0.5 millimeter of mercury. A fraction boiling at 82° C. to 83° C./0.6 millimeter of mercury was analyzed. It solidified on standing, melting point 43° C. to 47° C.

*Analysis.*—Calc. for $C_6H_9Br_2ClO$: C, 24.64; H, 3.10; Br+Cl, 66.78. Found: C, 24.84; H, 3.16; Br+Cl, 66.46 (assuming two bromine and one chlorine).

The infrared and mass spectra were in agreement with the assigned structure.

Example 2

This example illustrates the preparation of 4,4-dichloro-3-(chloromethyl)tetrahydropyran.

This compound was prepared under conditions similar to those used in Example 1, except that bis(bromomethyl) ether and zinc bromide were replaced by bis(chloromethyl) ether and zinc chloride, respectively. A pure sample of 4,4-dichloro-3-(chloromethyl)tetrahydropyran had the following physical properties: Boiling point 49° C./0.3 millimeter of mercury, $n_D^{20}$ 1.5070, $d^{20}$ 1.375.

*Analysis.*—Calc. for $C_6H_9Cl_3O$: C, 35.41; H, 4.46; Cl, 52.28; $M_D$, 43.94. Found: C, 36.07; H, 4.52; Cl, 52.06; $M_D$, 44.04.

The infrared and mass spectra were in agreement with the assigned structure.

4,4-dichloro-3-(chloromethyl)tetrahydropyran is useful as a plasticizer for vinyl halide polymers in quantities as little as 5 weight percent or less.

What is claimed is:

1. A 4,4-dihalotetrahydropyran compound having the formula

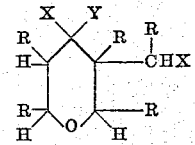

wherein R is a member selected from the group consisting of hydrogen and alkyl having between one and eight carbon atoms, X is a member selected from the group consisting of chlorine and bromine, and Y is a member selected from the group consisting of chlorine, bromine and fluorine.

2. 4,4-dichloro-3-(chloromethyl)tetrahydropyran.

3. 4-bromo-3-(bromomethyl)-4-chlorotetrahydropyran.

References Cited in the file of this patent

Olsen et al.: Chem. Abs., vol. 49, p. 4638 (1935).